ively, Patented June 28, 1955

2,712,026

O,O-DI-LOWER ALKYL THIONOPHOSPHORIC AZIDES

Gerhard Schrader, Opladen-Bruchhausen, Germany, assignor to Farbenfabriken Bayer Aktiengesellschaft, Leverkusen, Germany, a corporation of Germany No Drawing. Application July 22, 1952,
Serial No. 300,325

Claims priority, application Germany August 10, 1951

6 Claims. (Cl. 260—349)

The present invention relates to new derivatives of thionophosphoric acid and to a process of making the same; more particularly it relates to compounds corresponding to the following general formula:

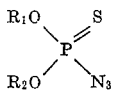

In this formula $R_1$ and $R_2$ stand for alkyl radicals which may be the same or different.

The new compounds may be obtained by reacting O,O-dialkyl-chloro-thionophosphates with alkali hydrazoates in indifferent solvents. As solvents particularly those can be used which are able to dissolve the slightly soluble alkali hydrazoates in small quantities; suitable solvents are e. g. acetone, methyl ethyl ketone, methyl propyl ketone. The reaction is carried out at elevated temperatures and renders good yields at temperatures of about 50° C. to about 100° C. Another process of preparing the new products is analogous to the process of producing sulfonic azides (cf. J. pr. Chem. 58, p. 166). This process, however, applied in the present case renders bad yields since the O,O-dialkylthionophosphoric hydrazides to be used as intermediates are difficult to prepare.

The new compounds being azides of O,O-dialkylthionophosphoric acids are colorless oils slightly soluble in water and can be distilled in vacuo without decomposition. At higher temperatures the O,O-dialkylthionophosphoric azides do not tend to explode but to puff off moderately.

Very surprising is the contact-insecticidal property of the new compounds. Thus e. g. O,O-diethylthionophosphoric azide kills aphids of different kinds in an applied concentration of 0.05 per cent. Red spider is killed even in a concentration of 0.005 per cent. On fly larvae the product shows killing effect in a dilution of 1:100,000.

The following examples are given to illustrate the present invention without, however, limiting it thereto:

*Example 1*

40 grams of finely pulverized sodium hydrazoate are suspended in 200 cc. of dry acetone. 33 grams of O,O-dimethylchloro-thionophosphate are added and the reaction product is heated on the water bath to the boil for 20 hours. Then the salts are filtered off and washed with acetone. The filtrate is freed from the solvent by evaporation. The residue distils at a pressure of 0.5 millimeters between 38 and 39° C. 18 grams of O,O-dimethylthionophosphoric azide of the formula:

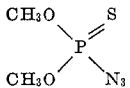

corresponding to 51 per cent of the theory are obtained in the form of a water-clear oil being slightly soluble in water.

*Example 2*

40 grams of finely pulverized sodium hydrazoate are suspended in 200 cc. of methyl ethyl ketone. 38 grams of O,O-diethyl-chloro-thionophosphate are added with stirring. The reaction mixture is boiled on the water bath with reflux for 20 hours and is worked up according to Example 1. 33 grams of O,O-diethylthionophosphoric azide of the formula:

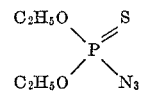

are obtained having a boiling point of 60° C. at 1.5 millimeters pressure. The azide is obtained in a yield of 84 per cent and represents a slightly water-soluble, colorless oil which can be heated to temperatures of 120° C. without danger.

*Example 3*

40 grams of sodium hydrazoate are suspended in 200 cc. of methyl propyl ketone. 44 grams of O,O-dipropyl-chloro-thionophosphate are added to this suspension. The mixture is heated on the boiling water bath for 18 hours with stirring and is then worked up according to Example 1. 31 grams of O,O-dipropylthionophosphoric azide of the formula:

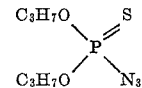

are obtained having a boiling point of 77 to 78° C. at 1 millimeter pressure. The azide obtained in a yield of 69 per cent is a colorless oil and insoluble in water.

I claim:

1. Compounds of the general formula:

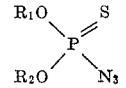

wherein $R_1$ and $R_2$ stand for lower alkyl radicals.

2. The compound of the formula:

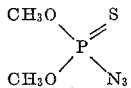

being an oily liquid boiling at 38 to 39° C. at 0.5 millimeter pressure.

3. The compound of the formula:

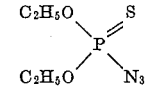

being an oily liquid boiling at 60° C. at 1.5 millimeters pressure.

4. The compound of the formula:

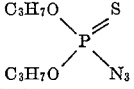

being an oily liquid boiling at 77 to 78° C. at 1 millimeter pressure.

5. A method for the preparation of compounds of the general formula:

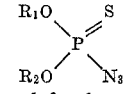

wherein $R_1$ and $R_2$ stand for lower alkyl radicals, which comprises reacting an O,O-di- lower alkyl-chlorothionophosphate with an alkali hydrazoate in an inert organic solvent.

6. The process of claim 5 wherein the inert organic solvent is one capable of dissolving the alkali hydrazoate in small quantities.

No references cited.